US012078968B2

(12) United States Patent
Franzi

(10) Patent No.: US 12,078,968 B2
(45) Date of Patent: Sep. 3, 2024

(54) ISOTHERMAL CLOCK DEVICE

(71) Applicant: Omega SA, Biel/Bienne (CH)

(72) Inventor: Edoardo Franzi, Cheseaux-Noréaz (CH)

(73) Assignee: Omega SA, Biel/Bienne (CH)

( * ) Notice: Subject to any disclaimer, the term of this patent is extended or adjusted under 35 U.S.C. 154(b) by 80 days.

(21) Appl. No.: 17/510,666

(22) Filed: Oct. 26, 2021

(65) Prior Publication Data

US 2022/0179368 A1 Jun. 9, 2022

(30) Foreign Application Priority Data

Dec. 9, 2020 (EP) .................................... 20212866

(51) Int. Cl.
*G04B 43/00* (2006.01)
*G04B 37/04* (2006.01)

(52) U.S. Cl.
CPC ........... *G04B 43/005* (2013.01); *G04B 37/04* (2013.01)

(58) Field of Classification Search
CPC ..... G04B 37/05; G04B 37/1406; A45C 11/10; A44C 5/00; A44C 5/12
See application file for complete search history.

(56) References Cited

U.S. PATENT DOCUMENTS

| | | | | |
|---|---|---|---|---|
| 2,540,501 A * | 2/1951 | Adams | A45C 11/10 968/347 |
| 3,030,763 A | 4/1962 | Klingenberg | |
| 3,738,100 A * | 6/1973 | Hassman | G04B 37/1486 368/282 |
| 3,740,944 A * | 6/1973 | Chopard | G04B 43/005 368/286 |
| 4,597,138 A * | 7/1986 | Hirsch | G04B 37/1426 24/593.1 |
| 2012/0155230 A1 | 6/2012 | Patt | |
| 2022/0404776 A1* | 12/2022 | Ummel | G04B 43/005 |

FOREIGN PATENT DOCUMENTS

| | | | | |
|---|---|---|---|---|
| CN | 2831192 Y | 10/2006 | |
| CN | 203 747 909 U | 7/2014 | |
| CN | 106 325 041 A | 1/2017 | |
| FR | 2742638 A1 * | 6/1997 | A44C 5/147 |

(Continued)

OTHER PUBLICATIONS

Translation of FR2742638, Espacenet.*

(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

An isothermal clock device for mechanical and/or functional components of a watch, the device being provided with a bracelet and a casing including an enclosure wherein a case of said watch is capable of being arranged and a reversible fastening device fastening the case of a watch in the enclosure of the casing by keeping it away from the set of elements of the casing defining this enclosure, the fastening device including at least two connecting members each connected to an attachment area of the case from at least one telescopic bar.

16 Claims, 1 Drawing Sheet

(56) References Cited

FOREIGN PATENT DOCUMENTS

| | | | |
|---|---|---|---|
| FR | 2 752 959 | A1 | 3/1998 |
| WO | WO 2018/215491 | A1 | 11/2018 |

OTHER PUBLICATIONS

European Search Report issued May 21, 2021 in European Application 20212866.6 of Dec. 9, 2020, 3 pages (with English Translation of Categories of cited documents).

Office Action issued Feb. 5, 2024, in corresponding Korean Patent Application No. 10-2021-0164326 with English translation, 11 pages.

Office Action issued May 21, 2024, in corresponding Chinese Patent Application No. 202111491749.7 with English translation, citing documents 15 and 24 therein, 11 pages.

Refrigeration Engineering Technical Dictionary (pp. 307-308), 4 pages.

* cited by examiner

ISOTHERMAL CLOCK DEVICE

CROSS-REFERENCE TO RELATED APPLICATION

This application claims priority to European Patent Application No. 20212866.6 filed on Dec. 9, 2020, the entire disclosure of which is hereby incorporated herein by reference.

TECHNICAL FIELD

The invention relates to an isothermal clock device for mechanical and/or functional components of a watch in particular adapted to operate under extreme temperatures. Such a device can also be called a Dewar clock device or more simply a Dewar device.

TECHNOLOGICAL BACKGROUND

An electronic watch conventionally comprises a bracelet and a watch case including several electrical or electronic components. It is known in the state of the art that some of these components do not withstand extreme temperatures, and cease operating properly at these temperatures. Typically, liquid crystal displays LCD using light-emitting diodes, or else quartz, tolerate temperatures not exceeding 80° C. (degrees Celsius) approximately, and not falling below 0° C. However, in particular environments such as, for example, space or lunar missions, the temperatures can frequently reach values in the range of substantially −150° C. to +125° C.

There is therefore a need to be able to use a watch, in particular an electronic watch, in environments where such extreme temperatures can prevail.

SUMMARY OF THE INVENTION

To this end, the invention relates to a Dewar device for mechanical and/or functional components of a watch, said device being provided with a bracelet and a casing including an enclosure in which a case of said watch is capable of being arranged and a reversible fastening device fastening said watch case in said enclosure of the casing by keeping it away from the set of elements of the casing defining this enclosure, said fastening device including at least two connecting members each connected to an attachment area of said case from at least one telescopic bar.

Thanks to the Dewar device formed by the casing and the watch case, the mechanical and/or functional components of the watch are protected from possible extreme temperatures comprised between −150 and +125 degrees Celsius that can prevail outside said device. In addition, said at least one connecting element, ensuring the fastening of the watch case to the casing, contributes to ensuring very good thermal insulation of the case by preventing any heat loss of this watch case 6, in particular by radiation. Thus, such a Dewar device allows using mechanical and/or functional components in contexts and environments where the temperatures can be extreme, such as for example during space exploration missions such as the exploration of the planet Mars or else the Moon. This also allows rationalising costs as well as to maintaining a reasonable complexity for the components used in watches requested for such missions.

In other embodiments:

- each member comprises a contact area capable of cooperating with a first pointed end of each bar;
- each bar comprises a second end capable of being connected to the attachment area, in particular to a horn of this attachment area;
- each bar comprises a first portion comprising a first end of the bar and a second portion comprising a second end of this bar, the first and second portions being connected to each other by a resilient member, in particular a spring;
- the first portion is capable of sliding in a housing defined in the second portion;
- the resilient member is comprised in the housing defined in the second portion;
- the contact area is made of a material having a hardness comprised between 7 and 10 on the Mohs scale, preferably a hardness of 9 on the same scale;
- the contact area is made of a material having a Vickers hardness number comprised between 1200 and 3500 $kg_f \cdot mm^{-2}$;
- said fastening device carries out a reversible fastening of the watch case to a back of the casing;
- said enclosure is under vacuum or almost under vacuum;
- the casing comprises a crystal whose surface is substantially greater or strictly greater than a crystal of the watch case;
- a crystal of the watch case is disposed opposite to a crystal of the casing when the watch case is arranged in said enclosure;
- the device comprises a middle on which said bracelet is fastened;
- said set of elements of the casing forming said enclosure comprises a crystal, an inner peripheral wall of a middle and a back of this casing;
- each connecting member is arranged on an inner peripheral wall of the enclosure of the casing opposite to the attachment area.

BRIEF DESCRIPTION OF THE FIGURES

Other features and advantages will emerge clearly from the description which is given below, by way of illustration and without limitation, with reference to the appended figures, in which.

DETAILED DESCRIPTION OF THE INVENTION

Figure 1:
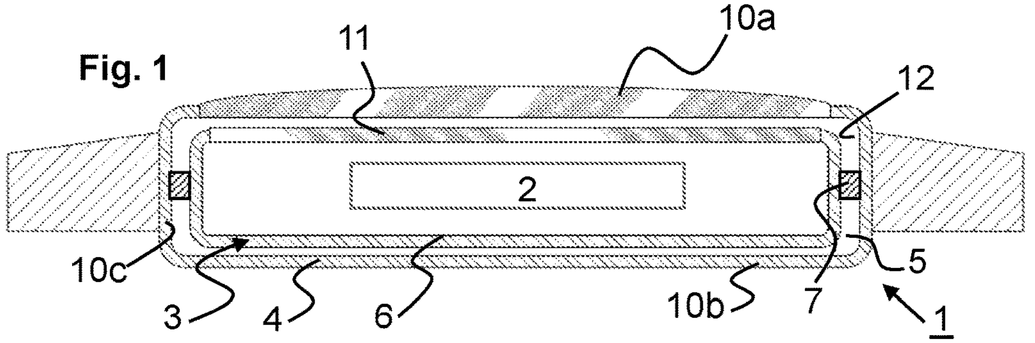
FIG. 1 is a sectional view of a schematic representation of a Dewar device for mechanical and/or functional components of a watch, according to one embodiment of the invention.
Figure 2:
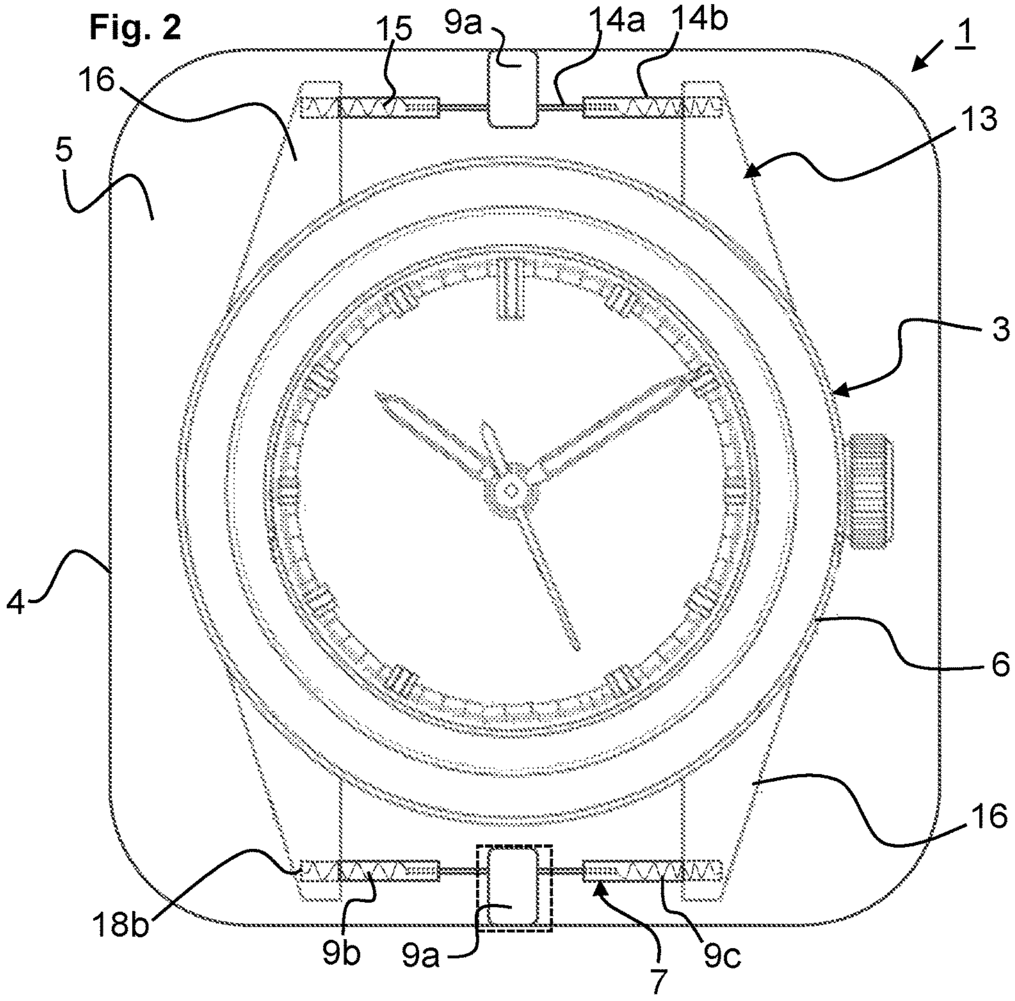
FIG. 2 is a schematic representation of a casing of the Dewar device through which a case of said watch, which is reversibly mounted in an enclosure of said casing, is made visible, according to the embodiment of the invention.

FIGS. 1 and 2 represent an isothermal clock device 1 for mechanical and/or functional components 2 of a watch 3 also called Dewar clock device or more simply in the remainder of the description “Dewar device”. Such a Dewar device 1 for mechanical and/or functional components 2 of a watch 3 is capable of participating in imparting good thermal insulation to mechanical and/or functional components 2 of the watch 3, a case 6 of which is arranged in this casing 4 of the device 1 in order to ensure such insulation to these components 2. In other words, this Dewar device 1 is in particular formed by the combination of the casing 4 thereof and the case 6 of a watch 3 in order to make a thermal insulation suitable for these mechanical and/or functional components 2. In this configuration, the case 6 of a watch 3 is arranged in an enclosure 5 of the casing 4 while being kept away or at a distance from the set of elements 10*a* to 10*c* of the casing 4 defining this called enclosure 5, namely a crystal 10*a*, an inner peripheral wall 12 of a middle 10*c* and a back 10*b* of this casing 4. It will be noted that this inner peripheral wall 12 is also that of said enclosure 5.

This remoteness or this distance or even this spacing is configured from a fastening device 7 of the case 6 of a watch 3 in the casing 4. In other words, such a fastening device 7 is capable of configuring a spacing between said case 6 and the set of elements 10*a*, 10*b*, 10*c* of the casing 4 forming said enclosure 5 of this casing 4. This fastening device 7 that we will describe below, contributes to reducing or even eliminating any thermal conduction between the inner peripheral wall 12*a* of the middle 10*c* and/or the back 10*b* and/or the crystal 10*a* with the case 6 of a watch 3 in particular with an external overall face of this case 6. This external overall face includes an upper face comprising the crystal 11 of the case 6 of this watch 3, a lower face comprising a back of said case 6 and an outer peripheral wall of a middle of this case 6. It is understood that the lower and upper faces are opposite to each other.

It will be noted that such a case 6 is included in a watch 3 which can be an electronic watch, for example a quartz watch, or even a mechanical watch.

The previously mentioned mechanical and/or functional components 2 of the watch 3, comprise in a non-limiting and non-exhaustive manner: a horological movement, a dial, hands, rings, joints and/or electronic and/or electrical components 2. It will be noted, in particular, that such electronic and/or electrical components include, for example, a display device, a processor, a memory, an energy storage component, a motor, an integrated circuit and an electronic oscillator, etc . . . .

It is therefore understood that in this configuration, this Dewar device 1 has the same properties and characteristics as a Dewar tube/vessel well known in the state of the art. As we have previously mentioned, the properties and characteristics of this Dewar device 1 participate in conferring it good thermal insulation relative to particularly extreme temperatures that may prevail in the external environment in which such a device 1 can be located.

In this context, this device 1 therefore comprises the casing 4 which includes the middle 10*c* on which a bracelet, allowing a user of this device 1 to wear it, is mounted. This casing 4 also includes the crystal 10*a* and the base 10*b* which are mentioned above. In this device 1, it will be noted that the crystal 10*a* preferably comprises a surface which is substantially greater than or strictly greater than a crystal 11 of the case 6 of a watch 3.

As we have seen, the crystal 10*a*, the middle 10*c* and the back 10*b* of this device 1 together define the enclosure 5 of this casing 4 which is likely to receive the case 6 of a watch 3. These three elements 10*a* to 10*c* of the casing 4, namely the middle 10*c*, the crystal 10*a* and the back 10*b* can be distinct elements which are joined together to construct this enclosure 5. Alternatively, the middle 10*c* and the back 10*b* of the casing 4 can together form a one-piece part, said one-piece part defining an opening opposite the back 10*b* which is likely to be closed by the crystal 10*a* and this, in a reversible and sealed manner. Alternatively, the middle 10*c* and the crystal 10*a* of the casing 4 of a watch 3, can together form a one-piece part, said one-piece part defining an opening opposite the crystal 10*a* which is likely to be closed by the back 10*b* and this, also in a reversible and sealed manner.

The middle 10*c* and the back 10*b* are preferably made, in a non-limiting and non-exhaustive manner, of a metal material, of glass or of a thermosetting or thermoplastic polymer resins reinforced with carbon or glass fibres or else of ceramic materials. It will be noted that when the middle 10*c* and the back 10*b* are transparent or semi-transparent, being for example made of glass, the peripheral wall 12 of the middle 10*c* and the inner face of the back 10*b* can be coated with a metal reflective coating or the like, such as, for example, a silver layer.

In addition, the device 1 can comprise an interferometric filter arranged on an external overall face of the casing 4, namely on an outer peripheral wall of the middle 10*c* and/or of the outer faces of the crystal 10*a* and of the back 10*b* of this case 6 of a watch 3. This interferometric filter can be a mesh or a netting forming a coating on this external overall face of the casing 4. This mesh or a netting has a meshing whose dimensions are such that they only allow passing some predetermined wavelengths of the electromagnetic spectrum, typically the wavelengths of the visible domain.

Furthermore, in this device 1, when the case 6 of a watch 3 is arranged in the enclosure 5 of the casing 4, the space defined between this case 6 and the inner peripheral wall 12 of the middle 10*c*, the back 10*b* and the crystal 10*a* is empty of material or almost empty. In other words, the enclosure 5 is under vacuum or almost under vacuum.

In order to ensure holding the case 6 of a watch 3 in this enclosure 5, the Dewar device 1 and in particular the casing 4 comprises the fastening device 7 carrying out a reversible fastening of the case 6 of a watch 3 on the inner peripheral wall 12 of this casing 4. This fastening device 7 which is also called "reversible fastening device" comprises at least two connecting members 9*a* visible in FIGS. 1 to 3 which are each connected to an attachment area 13 of said case 6 from at least one telescopic bar 9*b*, 9*c*.

Figure 3:
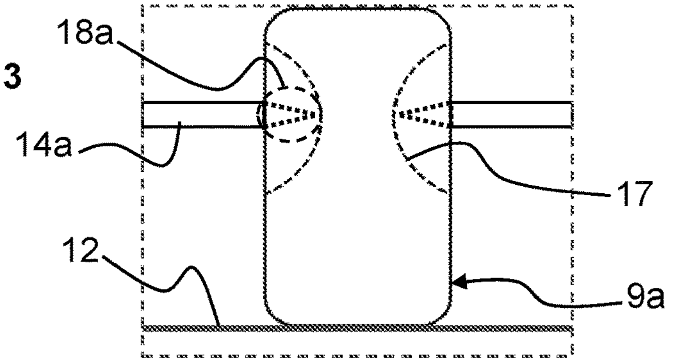
FIG. 3 is a larger-scale view of a connecting member of a reversible fastening device of the watch case in the enclosure of the casing of the Dewar device, according to the embodiment of the invention.

In the embodiment shown in FIGS. 1 to 3, the fastening device 7 comprises two connecting members 9*a* and four telescopic bars 9*b*, 9*c*. In this configuration, these two connecting members 9*a* are capable of cooperating each with two telescopic bars 9*b*, 9*c* in order to secure the fastening of the case 6 of a watch 3 in the enclosure 5 of the casing 4 from attachment areas 13 of this casing 4. Each connecting member 9*a* is arranged on the inner peripheral wall 12 of the enclosure 5 of the casing 4 by being disposed opposite to the attachment area 13 with which it is made to cooperate within the context of this fastening. This arrangement of each connecting member 9*a* on the inner peripheral wall 12 can be made by clipping, nesting, welding, gluing or even screwing.

When this attachment area 13 comprises a pair of horns as illustrated in FIG. 2, the body of each member 9*a* is then entirely or partially arranged in the space defined between the two horns 16, preferably equidistant from these horns 16. More specifically in the context of the realization of this fastening of the case 6 of a watch 3 in the casing 4, each connecting member 9*a* comprises two contact areas 17 which are arranged in this member 9*a* opposite to each other, by each being disposed on a lateral wall of this member 9*a*. The arrangement of each contact area 17 on a lateral wall is performed so that it is positioned opposite to or else aligned with an opening included in the horn 16. As will be seen below, this opening is intended to be connected with this contact area 17 via a telescopic bar 9*b*, 9*c*. In this fastening device 7, the contact area 17 is capable of receiving a first end 18*a* of the bar 9*b*, 9*c* and the opening has in the horn 16 which is preferably blind, is for its part configured to receive a second end 18*b* of this called bar 9*b*, 9*c*.

The contact areas 17 of each of these members are made of a material having:

- a hardness comprised between 7 and 10 on the Mohs scale, preferably a hardness of 9 on the same scale, or
- a Vickers hardness number comprised between 1200 and 3500 $kg_f mm^{-2}$.

In this context, such a material can be, in a non-limiting and non-exhaustive manner, corundum, a ruby, a sapphire or even ceramic. In addition, it will be noted that this material can also have low thermal conductivity properties.

In this fastening device 7, each telescopic bar 9*b*, 9*c* comprises a body formed of first and second portions 14*a*, 14*b* which are connected to each other in particular by a resilient member 15, for example a spring positioned in this second portion 14*b* of this body of the bar 9*b*, 9*c*. The first portion 14*a* of this bar 9*b*, 9*c* which is capable of sliding in the second portion 14*b*, comprises the first end 18*a* of the bar 9*b*, 9*c* which is likely to cooperate with the contact area 17 of each connecting member 9*a*. The second portion 14*b* of this bar 9*b*, 9*c* therefore comprises the second end 18*b* of the bar 9*b*, 9*c* which is intended to be disposed in the opening of the corresponding horn 16.

With reference to FIG. 3, in each bar 9*b*, 9*c*, the first end 18*a* is pointed. In other words, this first end 18*a* ends in a very acute angle contributing to reducing as much as possible a contact interface between this first end 18*a* and the contact area 17. In this context, the surface area of this first end can be between 10 and 10.106 $\mu m^2$. Such a small-sized contact interface contributes to greatly reducing or even eliminating the thermal conductivity of the fastening device 7 and therefore improving the thermal insulation of the components 2 from the external environment of the Dewar device 1.

In this configuration, when the case 6 of a watch 3 is disposed in the enclosure 5, the first and second ends 18*a*, 18*b* of each bar 9*b*, 9*c* are respectively arranged in the contact area 17 each connecting member 9*a* and in the opening of the corresponding horn 16. In order to carry out this arrangement of these ends 18*a*, 18*b*, the spring 15 included in the second portion 14*b* of the bar 9*b*, 9*c* is then compressed by the sliding of the first portion 14*a* of the body of the bar 9*b*, 9*c* in this second portion 14*b*. Thus, each bar 9*b*, 9*c* is disposed between the contact area 17 of the member and the opening of the horn 16 with a spring which is then stressed. It will be noted that in this configuration, the spring 15 of each bar 9*b*, 9*c* participates holding/fastening the case 6 in the enclosure 5 in particular by participating in absorbing any possible displacement of the case 6 relative to the casing 4 which may result from an acceleration, a deceleration and/or an abrupt/violent/sudden change of direction experienced by the Dewar device 1.

It will be noted that in an alternative, the fastening device 7 can comprise more than two connecting members. For example, it may comprise two pairs of connecting members each arranged in whole or in part between the horns 16 of an attachment area 13 of the case 6. In this configuration, only the lateral wall of the member of the pair which is disposed opposite to the opening of a horn 16 of the attachment area 13 comprises a contact area 17 in order to participate in the fastening of the case 6 in this enclosure 5.

Furthermore, such a fastening device 7 contributes to placing the case 6 of a watch 3 in this casing 4 so that the crystal 11 of this case 6 of a watch 3 is arranged opposite to the crystal 10*a* of the casing 4 so that the information comprised on the dial and/or the display interface of this watch 3 can be perceived through the transparent crystal 10*a* of the casing 4 by the user wearing the Dewar device 1.

Thus, such a Dewar device 1 provides the mechanical and/or functional components 2 of the watch 3 with a very good thermal insulation relative to the external environment by preventing a heat loss of the watch case 6 by radiation. Thus, when the temperature outside the device 1 reaches extreme values, typically in the range of −125 to +125° C., the temperature inside the enclosure 5 remains for its part substantially equal to the temperature present in the case 6 of a watch 3 during its arrangement in the casing 4, typically in the range of 20° C. It will be noted that regardless of the temperature conditions prevailing in the environment of the Dewar device 1, the temperature present in the case 6 of a watch 3 is a temperature which does not hinder the proper operation of the watch. This temperature is maintained for a period of time which is 5 to 18 times greater than the period of time during which such a watch case would be capable of preserving an operating temperature of its components 2 by being located directly in such an environment where such temperatures, which are in particular extreme, prevail (that is to say by being located outside the casing of the Dewar device). It is thus conceived that such a configuration allows protecting the mechanical and/or functional components 2 of the watch 3, as well as participating in ensuring their operation in an optimal manner in extreme outside temperature conditions.

The invention claimed is:

1. A Dewar device for mechanical and/or functional components of a watch, comprising:
   - a bracelet;
   - a casing including an enclosure; and
   - a middle on which said bracelet is fastened, wherein
   - a case of said watch is configured to be arranged in the enclosure,
   - a reversible fastening device is configured to fasten said case of said watch in said enclosure of the casing by keeping the case of said watch away from a set of elements of the casing defining said enclosure,
   - said set of elements of the casing comprises a crystal, an inner peripheral wall and a back of said casing,
   - a crystal of the case of a watch is disposed opposite to the crystal of the casing,
   - said fastening device includes at least two connecting members each connected to an attachment area of said case from at least one telescopic bar, and
   - each connecting member is arranged on the inner peripheral wall of the casing opposite to the attachment area.

2. The Dewar device according to claim 1, wherein each member comprises a contact area configured to cooperate with a first pointed end of each bar.

3. The Dewar device according to claim 1, wherein each bar comprises a second end configured to be connected to the attachment area.

4. The Dewar device according to claim 1, wherein each bar comprises a first portion comprising a first end of the bar and a second portion comprising a second end of said bar, the first and second portions being connected to each other by a resilient member.

5. The Dewar device according to claim 4, wherein the resilient member comprises a spring.

6. The Dewar device according to claim 1, wherein each bar comprises a first portion which is configured to slide in a housing defined in a second portion.

7. The Dewar device according to claim 1, wherein each bar comprises a first portion comprising a first end of the bar and a second portion comprising a second end of said bar, the first and second portions being connected to each other by a resilient member, said resilient member being comprised in a housing defined in the second portion.

8. The Dewar device according to claim 7, wherein the resilient member is a spring.

9. The Dewar device according to claim 1, wherein each member comprises a contact area configured to cooperate with a first pointed end of each bar, the contact area being made of a material having a hardness comprised between 7 and 10 on the Mohs scale.

10. The Dewar device according to claim 1, wherein each member comprises a contact area configured to cooperate with a first pointed end of each bar, the contact area being made of a material having a Vickers hardness number comprised between 1200 and 3500 $kg_f \cdot mm^{-2}$.

11. The Dewar device according to claim 1, wherein said fastening device carries out a reversible fastening of the case of a watch to a back of the casing.

12. The Dewar device according to claim 1, wherein said enclosure is under vacuum or almost under vacuum.

13. The Dewar device according to claim 1, wherein the casing comprises a crystal whose surface is greater than a surface of a crystal of the case of a watch.

14. The Dewar device according to claim 1, wherein a second end of each bar is connected to a horn of an attachment area.

15. The Dewar device according to claim 1, wherein the fastening device keeps the case completely separated from the set of elements of the casing.

16. A Dewar device for mechanical and/or functional components of a watch, comprising:

a casing including a set of elements forming an enclosure;

a middle on which a bracelet of the watch is fastened;

a watch case configured to be arranged in the enclosure; and a reversible fastening device configured to fasten the watch case in the enclosure of the casing such that the watch case does not contact the casing, wherein the set of elements of the casing comprises a crystal, an inner peripheral wall and a back of the casing, a crystal of the watch case is disposed opposite to the crystal of the casing, and connecting members of the fastening device are arranged on the inner peripheral wall of the casing opposite to an attachment area to which at least two connecting members are each connected.

* * * * *